US012725504B1

(12) United States Patent
Tullos

(10) Patent No.: US 12,725,504 B1
(45) Date of Patent: Sep. 1, 2026

(54) MULTI-SENSOR SITUATIONAL AWARENESS SYSTEM FOR ENHANCED FIRE PERSONNEL EFFECTIVENESS IN LOW-VISIBILITY CONDITIONS

(71) Applicant: Justin Tullos, Georgetown, TX (US)

(72) Inventor: Justin Tullos, Georgetown, TX (US)

( * ) Notice: Subject to any disclaimer, the term of this patent is extended or adjusted under 35 U.S.C. 154(b) by 0 days.

(21) Appl. No.: 19/411,107

(22) Filed: Dec. 5, 2025

(51) Int. Cl.
*G08B 21/04* (2006.01)
*G08B 21/14* (2006.01)

(52) U.S. Cl.
CPC ......... *G08B 21/0469* (2013.01); *G08B 21/14* (2013.01)

(58) Field of Classification Search
CPC ............................ G08B 21/0469; G08B 21/14
See application file for complete search history.

(56) References Cited

U.S. PATENT DOCUMENTS

| | | | | |
|---|---|---|---|---|
| 5,552,772 | A * | 9/1996 | Janky | G08B 21/0222 340/8.1 |
| 6,544,173 | B2 * | 4/2003 | West | A61B 5/6843 128/903 |
| 7,667,613 | B2 * | 2/2010 | Stevens | G09F 13/04 340/8.1 |
| 10,747,317 | B2 * | 8/2020 | Kielbasa | G06F 3/016 |
| 11,055,975 | B2 * | 7/2021 | Renkis | G06T 7/246 |
| 11,341,827 | B2 * | 5/2022 | Renkis | G06T 7/246 |
| 11,449,141 | B2 * | 9/2022 | Kielbasa | G08B 6/00 |
| 11,487,000 | B2 | 11/2022 | Li et al. | |
| 11,709,245 | B2 * | 7/2023 | Droitcour | G01S 13/581 342/28 |
| 12,427,086 | B1 * | 9/2025 | Brown | A61H 33/065 |
| 12,474,465 | B2 * | 11/2025 | Chen | G01S 5/02213 |
| 2009/0201161 | A1 * | 8/2009 | Stevens | G09F 7/00 340/573.4 |
| 2010/0201538 | A1 * | 8/2010 | Stevens | G09F 13/04 340/691.1 |
| 2016/0156880 | A1 | 6/2016 | Teich et al. | |
| 2018/0093769 | A1 * | 4/2018 | Sequeira | G01S 13/888 |
| 2019/0113974 | A1 * | 4/2019 | Kielbasa | G08B 6/00 |

(Continued)

FOREIGN PATENT DOCUMENTS

| | | |
|---|---|---|
| CN | 215961863 U | 3/2022 |
| CN | 114511982 B | 7/2022 |

(Continued)

OTHER PUBLICATIONS

Bounce Imaging, 360-Degree Tactical Cameras, https://bounceimaging.com/?, 2025.

(Continued)

*Primary Examiner* — Hoi C Lau
(74) *Attorney, Agent, or Firm* — HULSEY P.C.

(57) ABSTRACT

A situational awareness system includes a high-temperature-resistant enclosure, a first computer, and one or more sensors. The high-temperature-resistant enclosure is configured for one or more of manual and mechanical launching. The first computer is encased by the high-temperature-resistant enclosure, and the first computer includes a wireless communication interface configured to communicate with a second computer. The one or more sensors are configured to detect a presence of life. The one or more sensors include a radar sensor. The one or more sensors are communicatively coupled to the first computer.

20 Claims, 4 Drawing Sheets

(56) References Cited

U.S. PATENT DOCUMENTS

| | | | | |
|---|---|---|---|---|
| 2021/0216140 | A1* | 7/2021 | Kielbasa | G08B 21/06 |
| 2024/0077873 | A1* | 3/2024 | Pannala | G05D 1/0257 |
| 2024/0108925 | A1* | 4/2024 | Tang | A62C 31/02 |
| 2025/0376125 | A1* | 12/2025 | Pandite | B60R 21/01 |
| 2026/0048496 | A1* | 2/2026 | Thakur | B25J 5/007 |

FOREIGN PATENT DOCUMENTS

| | | | |
|---|---|---|---|
| CN | 113608355 | B | 7/2023 |
| CN | 116402245 | A | 7/2023 |
| CN | 111736147 | B | 3/2024 |
| CN | 113296163 | B | 8/2024 |
| CN | 115167455 | B | 4/2025 |
| CN | 119863703 | A | 4/2025 |
| CN | 120428244 | A | 8/2025 |
| DE | 102015102557 | B4 | 2/2023 |

OTHER PUBLICATIONS

Cai et al., Robust Human Detection under Visual Degradation via Thermal and mmWave Radar Fusion, https://arxiv.org/pdf/2307.03623, Jul. 7, 2023.

Hahn, Research and Conceptual Design of Sensor Fusion for Object Detection in Dense Smoke Environments, https://www.mdpi.com/2076-3417/12/22/11325, Nov. 8, 2022.

Sakai et al., Human and Object Detection in Smoke-filled Space using Millimeter-wave radar based Measurement System, https://www.researchgate.net/publication/220930341_Human_and_Object_Detection_in_Smoke-filled_Space_using_Millimeter-wave_radar_based_Measurement_System, Jan. 2006.

* cited by examiner

MULTI-SENSOR SITUATIONAL AWARENESS SYSTEM FOR ENHANCED FIRE PERSONNEL EFFECTIVENESS IN LOW-VISIBILITY CONDITIONS

BACKGROUND OF THE INVENTION

Field of the Invention

One technical field of the present disclosure is detection and rescue technology. Another technical field is fire-resistant multi-sensor assemblies for environmental monitoring and human detection.

Description of the Prior Art

It is known that structural firefighting inherently involves operating in environments where visibility is often reduced to zero by heavy smoke and darkness. Factors such as navigating unfamiliar layouts, locating trapped victims, identifying the seat of the fire, and recognizing potential structural collapse hazards under these conditions pose extreme risks to firefighter safety and may hinder operational effectiveness.

All operators face life-threatening danger when visual assessment fails in hazardous environments. Cameras, night vision, or human sight are rendered ineffective by smoke, dust, and structures. Operators need to quickly determine environmental factors such as (1) presence of life, (2) structural information (e.g., room size, obstacles, furniture, etc.), and (3) ambient conditions (e.g., smoke or other particles in the air).

Typical Thermal Imaging Cameras (TICs) may be used to detect infrared radiation emitted from objects within a field of view, convert the detected radiation into temperature-correlated electrical signals, and generate a visual representation of spatial temperature variations based on the electrical signals. While TICs are invaluable, they can be cumbersome, require line-of-sight, and their interpretation becomes increasingly challenging in complex thermal environments where intense heat can saturate the sensor or obscure critical details.

Therefore, there is a need in the art to provide an improved, rapidly deployable device that provides supplementary intelligence and enhances fire personnel awareness in burning environments.

SUMMARY OF THE INVENTION

It is an object of the present invention to provide a device for enhancing fire personnel awareness in burning environments.

It is another object of the present invention to provide a device for enabling detection of environmental factors such as (1) presence of life, (2) structural information (e.g., room size, obstacles, furniture, etc.), and (3) ambient conditions (e.g., smoke or other particles in the air) at locations in a burning environment that are difficult to access safely.

In order to overcome one or more objects, the present invention presents a situational awareness system. In one aspect, the situational awareness system includes a high-temperature-resistant enclosure, a first computer, and one or more sensors. The high-temperature-resistant enclosure is configured for one or more of manual and mechanical launching. The first computer is encased by the high-temperature-resistant enclosure, and the first computer includes a wireless communication interface configured to communicate with a second computer. The one or more sensors are configured to detect a presence of life. The one or more sensors include a radar sensor. The one or more sensors are communicatively coupled to the first computer.

In certain embodiments of the first aspect, the one or more sensors may include a thermal sensor, and one or more of the first computer and the second computer may be configured to correlate radar data from the radar sensor with thermal data from the thermal sensor. In certain embodiments, the second computer may include one or more processors, one or more non-transitory computer-readable media, a user interface, and program instructions stored on the one or more non-transitory computer-readable media. The program instructions may be executable by the one or more processors to receive sensor data from the first computer and display, on the user interface, a visual depiction of at least a portion of an environment near the high-temperature-resistant enclosure. The visual depiction may be based at least in part on the sensor data. In certain embodiments, the presence of life may correspond to the life of a human. In certain embodiments, the one or more sensors may be configured to detect a size and layout of a room and a presence and location of furniture in the room. In certain embodiments, the one or more sensors may be configured to detect a presence of smoke. In certain embodiments, the one or more sensors may be configured to detect a temperature layout of an environment. In certain embodiments, the high-temperature-resistant enclosure may include at least one window. For example, and without limitation, the high-temperature-resistant enclosure may have several windows (e.g., six) in order to enable a wide frame of view (up to a full 360-degree view, including the top and bottom) for the one or more sensors; however, in certain other embodiments, the high-temperature-resistant enclosure may have a single window. In certain embodiments, the high-temperature-resistant enclosure may be substantially round, and the one or more of manual and mechanical launching may include rolling the high-temperature-resistant enclosure.

In a second aspect, disclosed herein is a method of using a situational awareness system. The method includes (1) manually or mechanically launching a high-temperature-resistant enclosure of the situational awareness system such that the high-temperature-resistant enclosure is delivered to a location at or near a high-temperature area, (2) detecting one or more environmental factors using one or more sensors encased by a high-temperature-resistant enclosure of the situational awareness system, (3) communicating first data corresponding to the detected environmental factors from the one or more sensors to a first computer encased by the high-temperature-resistant enclosure of the situational awareness system, and (4) performing a wireless communication between the first computer and a second computer using a wireless communication interface of the first computer. A first at least one of the one or more environmental factors may be detected using a radar sensor of the one or more sensors, and a second at least one of the one or more environmental factors may indicate a presence of life.

In certain embodiments of the second aspect, the method may further include correlating radar data from the radar sensor with thermal data from a thermal sensor using one or more of the first computer and the second computer. In certain embodiments, the method may further include (1) receiving, at the second computer, sensor data from the first computer and (2) displaying, on a user interface of the second computer, a visual depiction of at least a portion of an environment near the high-temperature-resistant enclosure. The visual depiction may be based at least in part on the sensor data. In certain embodiments, the presence of life may correspond to the life of a human. In certain embodiments, the method may further include detecting, via the one or more sensors, (1) a size and layout of a room and (2) a presence and location of furniture in the room. In certain embodiments, the method may further include detecting a presence of smoke via the one or more sensors. In certain embodiments, the method may further include detecting a temperature layout of an environment via the one or more sensors. In certain embodiments, the high-temperature-resistant enclosure may include at least one window. In certain embodiments, the high-temperature-resistant enclosure may be substantially round, and the one or more of manual and mechanical launching may include rolling the high-temperature-resistant enclosure.

In a third aspect, disclosed herein is a multi-sensor situational awareness system. The multi-sensor situational awareness system includes (1) a high-temperature-resistant enclosure configured for one or more of manual and mechanical launching, (2) at least one window disposed on the high-temperature-resistant enclosure, (3) two or more sensors encased by the high-temperature-resistant enclosure, (4) a first computer, and (5) a second computer. The two or more sensors may include a radar sensor and a thermal sensor. The first computer may include a wireless communication interface configured to communicate with the second computer. The first computer may be encased by the high-temperature-resistant enclosure. The second computer may be located remote from the high-temperature-resistant enclosure. The second computer may include (1) one or more processors, (2) one or more non-transitory computer-readable media, (3) a user interface, and (4) program instructions stored on the one or more non-transitory computer-readable media. The program instructions may be executable by the one or more processors to (1) receive sensor data from the first computer and (2) display, on the user interface, a visual depiction of at least a portion of an environment near the high-temperature-resistant enclosure. The visual depiction may be based at least in part on the sensor data. The two or more sensors may be configured to detect a presence of life. The two or more sensors may be communicatively coupled to the first computer. One or more of the first computer and the second computer may be configured to correlate radar data from the radar sensor with thermal data from the thermal sensor.

In certain embodiments of the third aspect, the high-temperature-resistant enclosure may be substantially round, and the one or more of manual and mechanical launching may include rolling the high-temperature-resistant enclosure.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

DETAILED DESCRIPTION OF THE PREFERRED EMBODIMENT

Figure 1:
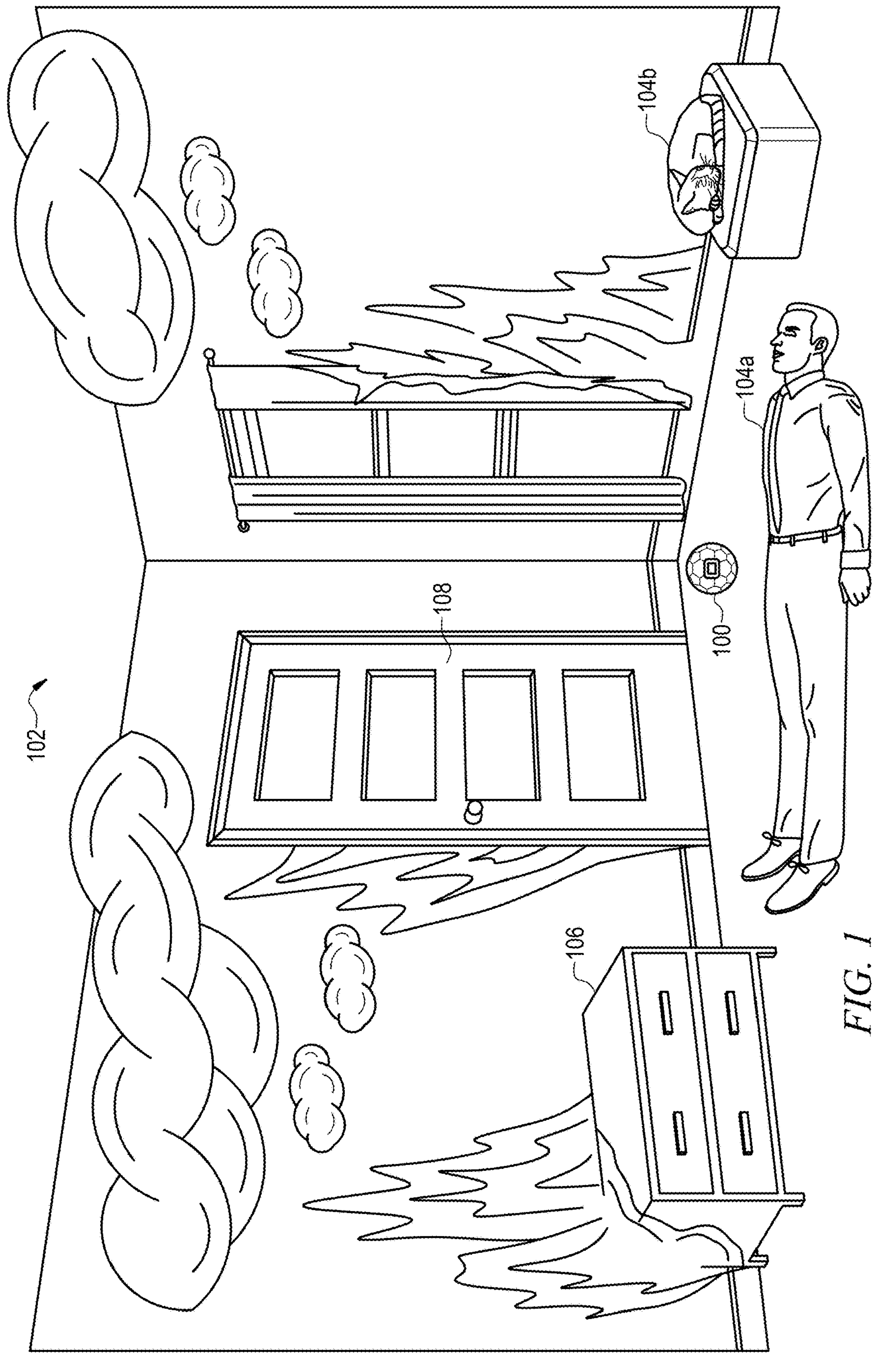
FIG. 1 is an illustration conceptualizing use of a multi-sensor situational awareness system in a burning environment, according to one embodiment of the present disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As used herein, the term "coupled" should be understood to include any direct or indirect connection between two things, such as a wired, mechanical, or other physical connection, a wireless or other non-physical connection, a connection allowing for fluid communication, a connection enabling a transfer of energy, or any combination thereof. Furthermore, the words "comprising" and any form of comprising, such as "comprise" and "comprises,", "having" and any form of having, such as "has" and "have,", "including" and any form of including, such as "includes" and "include," or "containing" and any form of containing, such as "contains" and "contain," are inclusive and open-ended and do not exclude additional, unrecited elements or method steps.

As used herein, the term "at least one of" is synonymous with "one or more of." For example, the phrase "at least one of A, B, and C" means any one of A, B, and C, or any combination of any two or more of A, B, and C. For example, "at least one of A, B, and C" includes one or more of A alone; one or more of B alone; one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of." For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

As used herein, the term "computer" (and any derivatives thereof) refers to any system of one or more devices that stores, retrieves, and processes data. Thus, a single server, personal computer, microprocessor, or smart device could be described as a "computer" within the meaning of the present disclosure, as could a system containing any number of one or more constituent computers.

As used herein, the term "fire personnel" (and any derivatives thereof) refers to firefighters, first responders, and other individuals endeavoring to protect property, animals, and/or people during a fire-related emergency.

Firefighting inherently involves operating in environments where visibility is often reduced to zero by heavy smoke and darkness. Factors such as navigating unfamiliar layouts, locating trapped victims, identifying the seat of the fire, and recognizing potential structural collapse hazards under these conditions pose extreme risks to firefighter safety and may hinder operational effectiveness.

All operators face life-threatening danger when visual assessment fails in hazardous environments. Cameras, night vision, or human sight are rendered ineffective by smoke, dust, and structures. Operators need to quickly determine environmental factors such as (1) presence of life, (2) structural information (e.g., room size, obstacles, furniture, etc.), and (3) ambient conditions (e.g., smoke or other particles in the air).

While Thermal Imaging Cameras (TICs) are invaluable, they can be cumbersome, require line-of-sight, and their interpretation becomes increasingly challenging in complex thermal environments where intense heat can saturate the sensor or obscure critical details. A critical need persists for a rapidly deployable tool that provides supplementary intelligence and enhances situational awareness before full commitment or during firefighting operations.

To address these problems (among others), disclosed herein is detection and rescue technology for enhancing fire personnel safety and effectiveness in low-visibility or no-visibility environments. The present disclosure addresses these problems (among others) through the use of a high-temperature-resistant enclosure configured for one or more of manual and mechanical launching. The high-temperature-resistant enclosure encases multiple sensors (for example, and without limitation, a radar sensor and a thermal sensor) configured to detect environmental factors such as (1) presence of life, (2) structural information (e.g., room size, obstacles, furniture, etc.), and (3) ambient conditions (e.g., smoke or other particles in the air). In certain embodiments, a user may launch the high-temperature-resistant enclosure (for example, and without limitation, by rolling and/or throwing it) into a high-temperature area (for example, and without limitation, a burning building). One or more sensors encased by the high-temperature-resistant enclosure may then detect one or more environmental factors. Data corresponding to these one or more environmental factors may be communicated from the one or more sensors to a computer (for example, and without limitation, a microprocessor) encased in the high-temperature-resistant enclosure. The computer may include a wireless communication interface, which may be configured to communicate with a second computer (for example, and without limitation, a smart device, server, laptop, or other computer) located elsewhere. A user may use the second computer to view a display configured to communicate information relating to the one or more environmental factors. This information may enable fire personnel to operate more effectively and more safely, armed with knowledge including one or more of (1) the presence and location of life (including humans and pets), (2) the size and layout of the room, (3) the presence and location of furniture and obstacles, (4) the temperature layout of the environment, (5) other pertinent information. In certain other embodiments, the high-temperature-resistant enclosure may be integrated with user apparel or gear rather than being configured for manual or mechanical launching.

In certain embodiments, the one or more sensors may include a radar sensor. The encased radar sensor and at least one computer (i.e., any combination of the encased computer, the second computer, and any other one or more computers) may be configured to identify signs of life, such as a person's chest moving due to breathing. Upon detecting small movements indicating a presence of life, a custom signature/classifier may classify the detected location as having a presence of life. In certain embodiments, the radar sensor may operate at sixty gigahertz. The radar sensor may excel in contexts in which traditional thermal imaging struggles, including in dark environments, environments having smoke, and/or environments having steam. One or more fusion algorithms may be used to correlate one or more inputs from the one or more sensors for high-confidence identification. In certain embodiments, the radar sensor may be configured to reveal proximate structures through dense smoke, through up to twenty centimeters (cm) of sheet rock/gypsum, through up to fifteen cm of wood, or through glass windows. The radar sensor may be further configured to maintain limited effectiveness through up to eight cm of concrete and to have limited effectiveness through thin metal surfaces. The depth values given in the present paragraph are given by way of example rather than limitation. Other radar depth penetration values may be used without departing from the scope of the present disclosure.

In an embodiment, the high-temperature-resistant enclosure may be substantially round and may be approximately the size of a softball. In certain embodiments, the one or more encased sensors may provide omnidirectional sensor coverage. In certain embodiments, the encased computer may be a microcomputer configured to aggregate sensor data from the one or more encased sensors. In certain embodiments, the encased computer and second computer may communicate via WiFi.

Accordingly, FIG. 1 is an illustration conceptualizing use of a multi-sensor situational awareness system in a burning environment. High-temperature-resistant enclosure 100 may include the aforementioned encased computer and one or more sensors. The one or more sensors may be configured to detect one or more factors relating to the environment 102, including any one or more of temperature, temperature layout, smoke presence and location, steam presence and location, room layout, locations of entrances and/or exits 108, locations of one or more humans 104*a*, locations of animals 104*b*, presence of life with respect to any one or more humans 104*a* and/or any one or more animals 104*b*, furniture location 106, and other pertinent environmental factors.

The disclosed detection and rescue technology embodies several advantages. First, a radar sensor may be configured to detect environmental factors through dense smoke, dust, and darkness more effectively than other sensing modalities. Second, the disclosed technology enables fire personnel to achieve faster victim location and hotspot identification. Third, in certain embodiments, the disclosed technology fuses radar presence data with thermal analysis, reducing false alarms from clutter or heat. Fourth, the disclosed technology enhances operator safety by providing awareness of unseen threats, occupants, and hazards. Fifth, the disclosed technology allows safer room entry and reduces fire personnel disorientation. Sixth, the disclosed technology is durable and fireground-ready. Seventh, the disclosed technology allows for determination of environmental factors before fire personnel entry, increasing safety and effectiveness. Eighth, the disclosed technology allows for assessment of difficult-to-access areas. Ninth, in certain embodiments, the use of multiple sensor types allows for higher confidence than that of single-sensor systems. The present paragraph includes only a few of the many advantages of the disclosed detection and rescue technology.

Figure 2A:
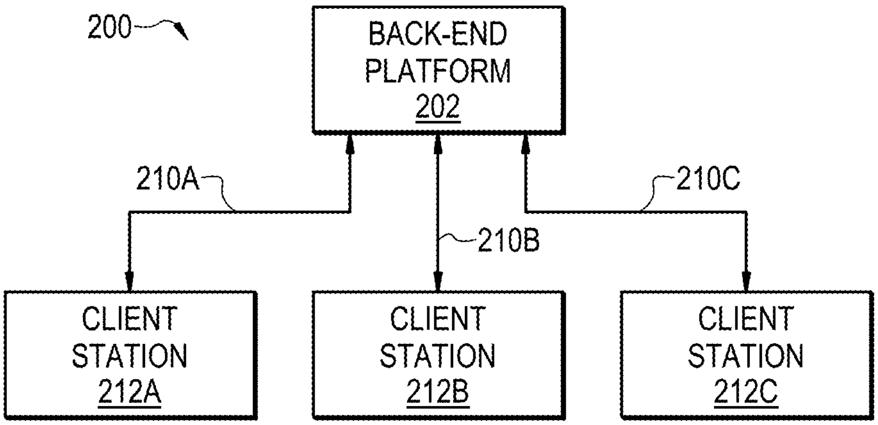
FIG. 2A depicts an example network configuration in which example embodiments may be implemented, according to one embodiment of the present disclosure.

FIG. 2A depicts an example network configuration 200 in which example embodiments of the present disclosure may be implemented. As shown in FIG. 2A, network configuration 200 includes a back-end platform 202 that may be communicatively coupled to one or more client stations, depicted here, for the sake of discussion, as client stations 212.

Broadly speaking, back-end platform 202 may comprise one or more computing systems that have been provisioned with software for carrying out one or more of the functions disclosed herein. The one or more computing systems of back-end platform 202 may take various forms and be arranged in various manners.

For instance, as one possibility, back-end platform 202 may comprise computing infrastructure of a public, private, and/or hybrid cloud (e.g., computing and/or storage clusters) that has been provisioned with software for carrying out one or more of the functions disclosed herein. In this respect, the entity that owns and operates back-end platform 202 may either supply its own cloud infrastructure or may obtain the cloud infrastructure from a third-party provider of "on demand" computing resources, such include Amazon Web Services (AWS) or the like. As another possibility, back-end platform 202 may comprise one or more dedicated servers that have been provisioned with software for carrying out one or more of the functions disclosed herein. Alternatively, back-end platform 202 may take the form of a host computer (e.g., a desktop, tablet, or smart device), and client station(s) 212 may each take the form of a microprocessor encased in a high-temperature-resistant enclosure 300 (see FIGS. 3A and 3B). Other implementations of back-end platform 202 are possible as well.

Client stations 212 may each include hardware components such as any one or more of a processor, data storage, a user interface, and a network interface, among others. In certain embodiments, client stations 212 may be configured to run front-end software (e.g., operating system software, web browser software, etc.). As representative examples, client stations 212 may each take the form of a desktop computer, a laptop, a netbook, a tablet, a smartphone, a microprocessor and/or a personal digital assistant (PDA), among other possibilities. FIG. 2A depicts three client stations 212, but any number of one or more client stations 212 may be used. In certain embodiments, an encased microprocessor may act as a client station 212 with respect to a host computer acting as a computing platform 202, and the host computer may in turn act as a client station 212 with respect to a central server acting as a computing platform 202. Thus, it is possible for a single computer to act as both a client station 212 and a computing platform 202.

As further depicted in FIG. 2A, back-end platform 202 is configured to interact with client stations 212 over respective communication paths 210. In this respect, each communication path 210 between back-end platform 202 and one of client stations 212 may generally comprise one or more communication networks and/or communications links, which may take any of various forms. For instance, each respective communication path 210 with back-end platform 202 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 210 with back-end platform 202 may be wireless, wired, or some combination thereof, and may carry data according to any of various different communication protocols. In wireless embodiments, any wireless communication technology may be used, including but not limited to Bluetooth and/or WiFi (e.g., 2.5 gigahertz/5 gigahertz). Although not shown, the respective communication paths 210 between client stations 212 and back-end platform 202 may also include one or more intermediate systems. For example, it is possible that back-end platform 202 may communicate with a given client station 212 via one or more intermediary systems, such as a host server (not shown). Many other configurations are also possible.

The interaction between client stations 212 and back-end platform 202 may take various forms. As one possibility, client stations 212 may send data from one or more sensors related to environmental factors to back-end platform 202, which may in turn trigger back-end platform 202 to take one or more actions based at least in part on received data. As another possibility, client stations 212 may send a request to back-end platform 202 for certain data and/or a certain front-end software module, and client stations 212 may then receive data (and perhaps related instructions) from back-end platform 202 in response to such a request. As yet another possibility, back-end platform 202 may be configured to "push" certain types of data to client stations 212, in which case client stations 212 may receive data (and perhaps related instructions) from back-end platform 202 in this manner. As still another possibility, back-end platform 202 may be configured to make certain types of data available via an API, a service, or the like, in which case client stations 212 may receive data from back-end platform 202 by accessing such an API or subscribing to such a service. The interaction between client stations 212 and back-end platform 202 may take various other forms as well.

Although not shown in FIG. 2A, back-end platform 202 may also be configured to receive data from one or more external data sources, such as an external database and/or another back-end platform or platforms. Such data sources—and the data output by such data sources—may take various forms.

It should be understood that network configuration 200 is one example of a network configuration in which embodiments described herein may be implemented. Numerous other arrangements are possible and contemplated herein. For instance, other network configurations may include additional components not pictured and/or more or less of the pictured components.

Figure 2B:
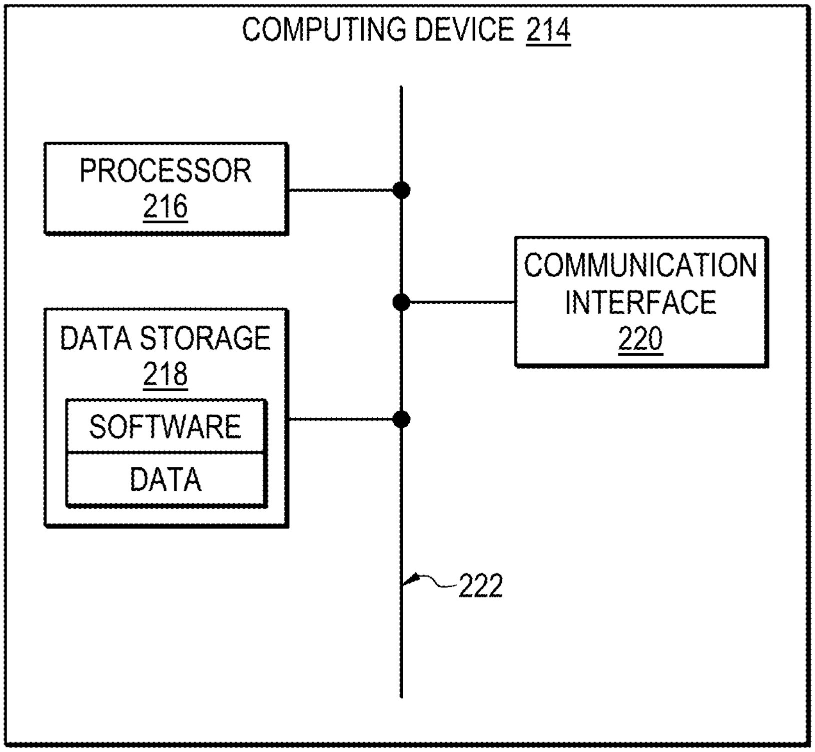
FIG. 2B depicts an example computing system that may be configured to carry out one or more of the functions of the present disclosure, according to one embodiment of the present disclosure.

FIG. 2B is a simplified block diagram illustrating some structural components that may be included in an example computing device 214, which could serve as, for instance, the back-end platform 202 and/or one or more of client stations 212 in FIG. 2A. In line with the discussion above, computing device 214 may include one or more of a processor 216, data storage 218, and a communication interface 220, all of which may be communicatively linked by a communication link 222 that may take the form of a system bus or some other connection mechanism.

Processor 216 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microprocessors), and/or any other processor components now known or later developed. In line with the discussion above, it should also be understood that processor 216 could comprise processing components that are distributed across a plurality of physical computing devices connected via a network, such as a computing cluster of a public, private, or hybrid cloud.

In turn, data storage 218 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 218 may comprise computer-readable storage mediums that are distributed across a plurality of physical computing devices connected via a network, such as a storage cluster of a public, private, or hybrid cloud.

As shown in FIG. 2B, data storage 218 may be provisioned with software components that enable the computing device 214 to carry out the operations disclosed herein. These software components may generally take the form of program instructions that are executable by the processor 216 to carry out the disclosed functions, which may be arranged together into software applications, virtual machines, software development kits, toolsets, or the like. Further, data storage 218 may be arranged to store data in one or more databases, file systems, or the like. Data storage 218 may take other forms and/or store data in other manners as well.

Communication interface 220 may be configured to facilitate wireless and/or wired communication with other computing devices or systems, such as one or more client stations 212 when computing device 214 serves as back-end platform 202, or as back-end platform 202 when computing device 214 serves as one of client stations 212. As such, communication interface 220 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 220 may also include multiple communication interfaces of different types. Other configurations are possible as well.

Although not shown, computing device 214 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 214.

It should be understood that computing device 214 is one example of a computing device that may be used with the embodiments described herein. Numerous other arrangements are possible and contemplated herein. For instance, other computing devices may include additional components not pictured and/or more or fewer of the pictured components.

Figure 3A:
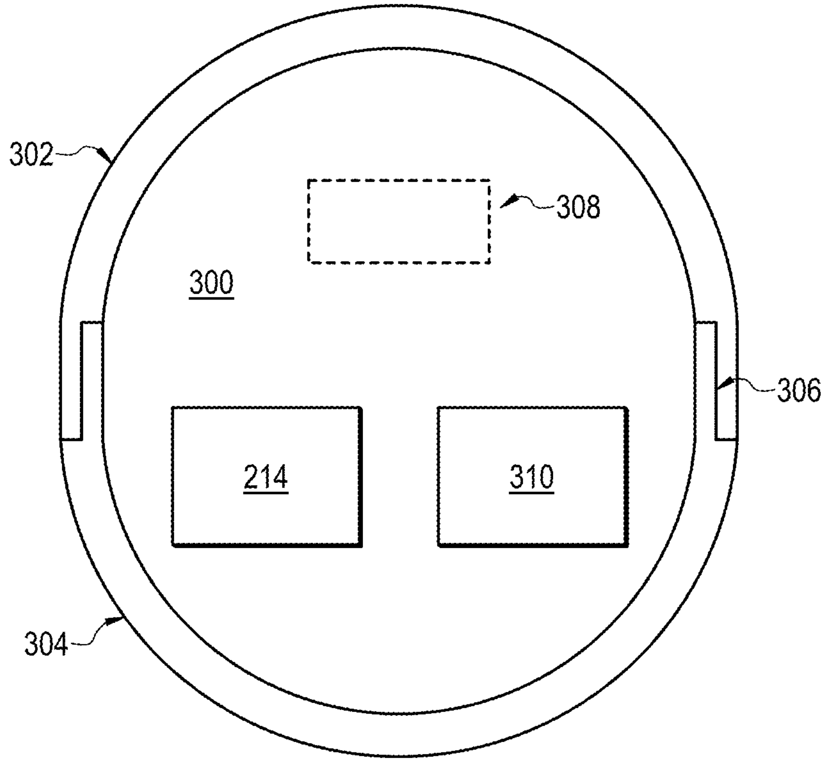
FIG. 3A depicts an example enclosure design for a multi-sensor situational awareness system suited for manual or mechanical launching, according to one embodiment of the present disclosure.

FIG. 3A depicts an example enclosure design for a multi-sensor situational awareness system suited for manual or mechanical launching. High-temperature-resistant enclosure 300 may include a first dome 302 and a second dome 304, which may be connected at connection point 306. Connection point 306 is depicted as a lap joint, but any suitable connection may be used without departing from the scope of the present disclosure. High-temperature-resistant enclosure 300 may encase computing device 214 and one or more sensors 310. In certain embodiments, computing device 214 may be a microprocessor. High-temperature-resistant enclosure 300 may further include one or more windows 308, which may assist one or more of the one or more sensors 310 in sensing the surrounding environment.

Though FIG. 3A depicts a cross-section of a substantially spherical high-temperature-resistant enclosure 300, other shapes and arrangements may be used. Elements may be added, removed, altered, or rearranged without departing from the scope of the present disclosure.

In certain embodiments, high-temperature-resistant enclosure 300 may include impact-absorbing features. Furthermore, high-temperature-resistant enclosure 300 may include a self-righting mechanism to ensure optimal sensor orientation regardless of how high-temperature-resistant enclosure 300 lands when manually or mechanically launched. In certain embodiments, the high-temperature-resistant enclosure 300 may be configured to sustain significant falls and impacts without damage to the enclosure or the internal electronics. Launching mechanisms may include any one or more of rolling, throwing, window pole extension, firing from a launcher, and other suitable launching techniques. High-temperature-resistant enclosure 300 may comprise one or more high-temperature-resistant polymers (for example, and without limitation, polyether ether ketone (PEEK) and/or polyetherimide (PEI)). High-temperature-resistant enclosure 300 may further comprise internal aerogel insulation and/or phase-change materials to protect computing device 214 and the one or more sensors 310 from transient heat exposure. Furthermore, high-temperature-resistant enclosure 300 may include sealing to prevent water and/or particulate ingress.

Because high-temperature-resistant enclosure 300 encloses electronics (e.g., computing device 214 and one or more sensors 310), certain protections against environmental conditions are warranted. For example, high-temperature-resistant enclosure 300 may be configured to provide protection against any one or more of (1) atmospheric material degradation/corrosion, (2) stress corrosion cracking, (3) galvanic corrosion, (4) extreme temperatures and creep, (5) ultraviolet radiation, (6) lightning strikes, (7) leaks/moisture, (8) electrostatic discharge, (9) internal charge buildup, and (10) other relevant environmental concerns. As one example, the system may be designed to protect against up to 1,300 degrees Fahrenheit in temperature. Furthermore, materials of the high-temperature-resistant enclosure 300 may be selected so as to ensure minimal signal loss and optimal radar performance. For example, materials having a low dielectric constant may be used to ensure fast signal propagation and minimal phase distortion. Materials having a low dissipation factor may reduce signal loss and improve power efficiency. Materials having a stable dielectric constant and dissipation factor over temperature and frequency may be used to maintain consistent radar performance in varying conditions. Minimal material adsorption and reflection may prevent signal degradation as it passes through the high-temperature-resistant enclosure 300. Additionally, thinner thickness of the enclosure may be utilized to reduce attenuation, and curved surfaces may help to reduce reflections and improve signal transmission. Environmental resistances such as ultraviolet radiation stability and moisture corrosion resistance may be utilized to optimize for durability of the enclosure and the electronics enclosed therein.

One example material that may be used to form the domes 302, 304 of high-temperature-resistant enclosure 300 is a Stainless Steel CRES 304L (Annealed) dome membrane with bonded Alumina ($Al_2O_3$, Purity 99.7%) tiles; this material is given by way of example rather than limitation, and other materials may be used without departing from the scope of the present disclosure. In certain embodiments, domes 302, 304 may be bonded at connection point 306 using an adhesive (for example, and without limitation, Resbond™ 940HT Adhesive, which is suitable for high-temperature use).

Window 308 may include fused quartz (fused silica, $SiO_2$), though other materials may be used in other embodiments. Fused quartz (fused silica, $SiO_2$) is a non-crystalline glass. Its dielectric constant and dissipation factor are ~3.8 and ~0.0001 respectively, which are suitable for the present application. In certain embodiments, window placement 308 may be performed using an adhesive.

The dielectric constant and dissipation factor of Alumina ($Al_2O_3$, Purity 99.7%) are ~9.8 and ~0.0011 respectively, which ensures fast signal propagation and minimal phase distortion as well as reduction of signal loss with improved power efficiency and consistent radar performance in varying conditions. The domes may have curved surfaces that may assist in reducing reflections and improving signal transmission. In certain embodiments, a thickness of 0.125 inches to 0.135 inches to reduce attenuation and protect the radar may be used, though other thicknesses may be used as well.

Alumina ($Al_2O_3$, Purity 99.7%) is an inorganic non-metallic material. Thus, its use presents no corrosion and flammability issue. The material has a max usage temperature (1,700 degrees Celsius), and there is no creep issue. The material is highly resistant to ultraviolet radiation.

In certain embodiments, the one or more sensors 310 may include at least one radar sensor and at least one thermal sensor. Additional sensors may be used without departing from the scope of the present disclosure. For example, and without limitation, the one or more sensors may include any one or more of a radar sensor, a thermal sensor, an optical sensor, a particulate sensor, a gas sensor, a chemical sensor, an acoustic sensor, a motion sensor, a humidity sensor, an airflow sensor, a pressure sensor, a radiation sensor, an ultrasonic sensor, a capacitive sensor, an inductive proximity sensor, and any other suitable sensor. In certain embodiments, one or more sensors 310 and computing device 214 may be configured to operate autonomously without external control. Certain embodiments may include an automatic victim alert system that triggers a haptic response on nearby fire personnel equipment. Furthermore, certain embodiments may include data relay capabilities across multiple units by utilizing communication interface 220 (shown in FIG. 2B) to extend signal range throughout complex structures.

In certain embodiments, a radar sensor of the one or more sensors 300 may detect smoke based on the manner in which smoke alters the dielectric properties of air; radar waves may interact with these changes and allow detection of smoke.

Certain embodiments may include power management systems enabling sleep/wake cycles to extend operational duration. For example, in certain embodiments, the one or more sensors 310 may include an accelerometer to wake the system from an ultra-low power state upon deployment impact, conserving battery life during storage and transit.

Computing device 214 may be configured to perform onboard data fusion, for example, by prioritizing correlating strong radar returns with plausible thermal signatures to identify potential victims. Certain embodiments may further employ flame mitigation filtering to reduce the prevalence of false positive detections.

In certain embodiments, computing device 214 may include a communication interface 220 (depicted in FIG. 2B) configured to use Wi-Fi Direct to establish a direct link to a second computer (e.g., an operator device). Certain embodiments may favor 2.4 GHz for enhanced penetration in structures. Computing device 214 may transmit data corresponding to a simplified graphical overlay or alert summary. Certain embodiments may further employ mesh networking capability between multiple deployed devices.

In certain embodiments, a Faraday cage may be used to block electromagnetic fields and to thereby protect the electronics. In such embodiments, to maintain the integrity of the Faraday cage, the high-temperature-resistant enclosure 300 may be designed without any apertures/slits on the enclosure.

Figure 3B:
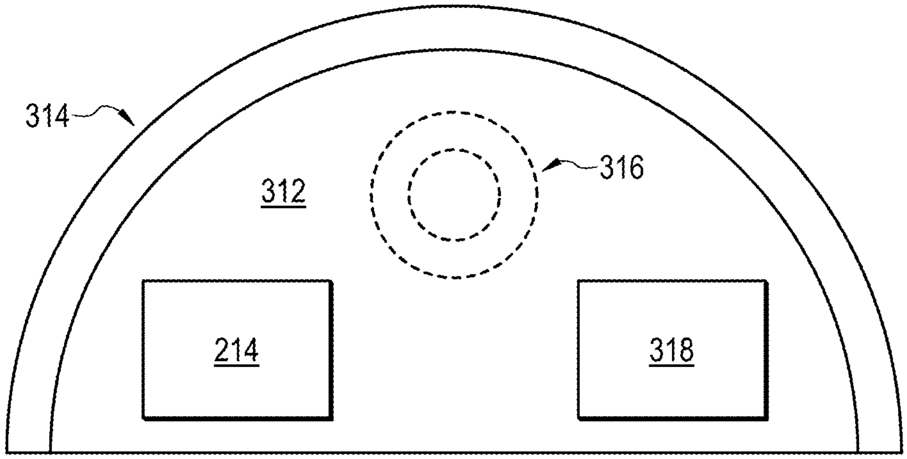
FIG. 3B depicts a second example enclosure design for a multi-sensor situational awareness system suited for integration with user apparel or gear, according to one embodiment of the present disclosure.

FIG. 3B depicts a second example enclosure design for a multi-sensor situational awareness system suited for integration with user apparel or gear. High-temperature-resistant enclosure 312 may comprise a dome 314 and at least one window 316. High-temperature-resistant enclosure 312 may include a computing device 214 and one or more sensors 318. In the design of FIG. 3B, high-temperature-resistant enclosure 312 may be integrated with user apparel or gear rather than being configured to be manually or mechanically launched. Certain embodiments may be specifically designed for crawling search operations; in such embodiments, forward-focused sensors aligned with typical search patterns may be used by fire personnel navigating smoke-filled environments. A downward-angled radar array may enhance floor scanning during low crawls, precisely where victims are most likely to be found. The system may interface with a user via one or more LED cues (e.g., yellow means that there are signs of life to the left, white means that there are signs of life ahead, and blue means there are signs of life to the right). In certain embodiments, the system may be supplemented with audio and/or haptic support to further assist in alerting fire personnel of environmental factors. By integrating the high-temperature-resistant enclosure 312 with user apparel or gear, fire personnel may retain use of their hands while simultaneously benefitting from enhanced detection capabilities. The system may include automatic positional calibration that adapts the user interface based on head position, thereby ensuring relevant information is always presented optimally regardless of the user's posture. In certain embodiments, high-temperature-resistant enclosure 312 may feature minimal profile extension (e.g., 35 millimeters of protrusion) to reduce snag hazards in confined spaces. Weight distribution may be balanced to minimize neck strain during extended operations. The system may be configured to integrate with self-contained breathing apparatus (SCBA) mask displays to provide information presentation without requiring additional equipment.

Figure 4:
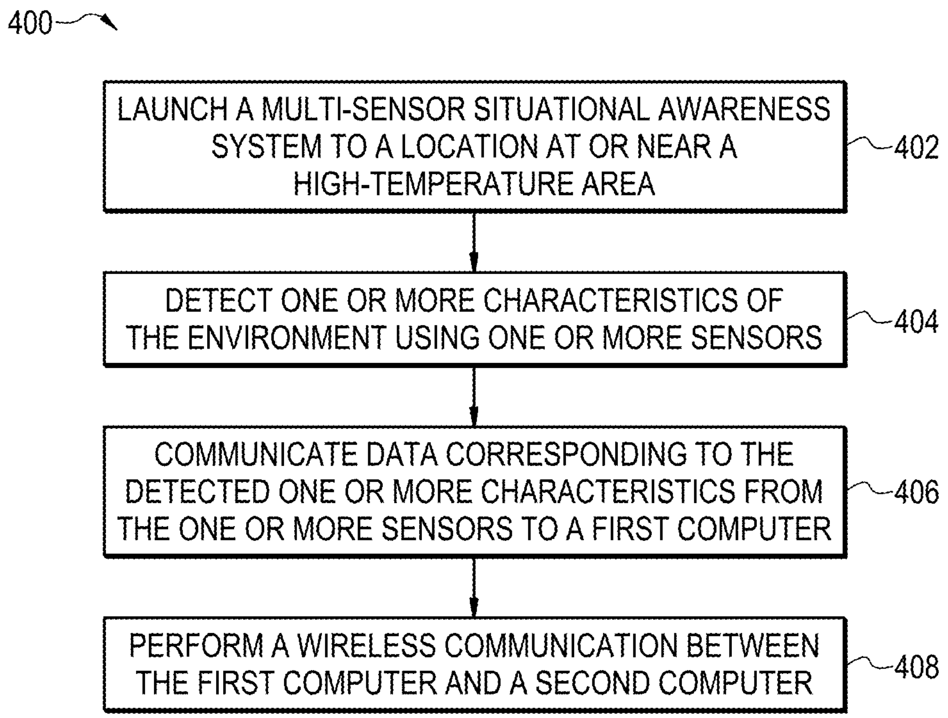
FIG. 4 is a flow diagram depicting one example of operations for using a multi-sensor situational awareness system, according to one embodiment of the present disclosure.

FIG. 4 is a flow diagram depicting one example of operations for using a multi-sensor situational awareness system, according to one embodiment of the present disclosure. At step 402, a user may launch a high-temperature-resistant enclosure (e.g., the high-temperature-resistant enclosure 300 of FIG. 3A) to a location at or near a high-temperature area. At step 404, one or more sensors encased by the high-temperature-resistant enclosure (e.g., the one or more sensors 310 of FIG. 3A) may detect one or more characteristics of the environment. The one or more characteristics of the environment may include any one or more of (1) the size and layout of the room, (2) the presence and location of furniture and obstacles, (3) the presence and location of life (including humans and pets), (4) the temperature layout of the environment, (5) the presence and location of smoke or other particles, and (6) other pertinent information. At step 406, the one or more sensors may communicate data corresponding to the detected one or more characteristics to a first computer (e.g., computing device 214 of FIGS. 2B and 3A). In certain embodiments, the first computer may be a microprocessor. At step 408, the first computer may utilize a communication interface (e.g., communication interface 220 of FIG. 2B) to perform a wireless communication between the first computer and a second computer. The second computer may be located at a different location from that of the high-temperature-resistant enclosure and encased first computer. The second computer may include any one or more of (1) one or more personal devices, (2) one or more desktop computers, (3) one or more servers, and (4) one or more other computers. For example, the second computer may comprise a desktop computer operated by a user located remote from the high-temperature-resistant enclosure that communicates with a server; in this case, both the desktop computer and the server may be referred to either jointly or individually as the "second computer" within the meaning of the present disclosure.

FIG. 4 describes one example of operations for using a multi-sensor situational awareness system, but other operations may be used. Elements may be added, removed, modified, or rearranged without departing from the scope of the present disclosure.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

I claim:

1. A situational awareness system comprising:

a high-temperature-resistant enclosure configured for one or more of manual and mechanical launching;

a first computer encased by the high-temperature-resistant enclosure, wherein the first computer comprises a wireless communication interface configured to communicate with a second computer;

the second computer, comprising:

one or more processors;

one or more non-transitory computer-readable media;

a user interface; and program instructions stored on the one or more non-transitory computer-readable media that are executable by the one or more processors to:

receive sensor data from the first computer; and display, on the user interface, a visual depiction of at least a portion of an environment near the high-temperature-resistant enclosure; and one or more sensors encased by the high-temperature-resistant enclosure, wherein the one or more sensors are configured to detect a presence of life, wherein the one or more sensors comprise a radar sensor, wherein the one or more sensors are communicatively coupled to the first computer, and wherein the visual depiction displayed on the user interface of the second computer is based at least in part on the sensor data.

2. The situational awareness system of claim 1, wherein the one or more sensors include a thermal sensor, and wherein one or more of the first computer and the second computer are configured to correlate radar data from the radar sensor with thermal data from the thermal sensor.

3. The situational awareness system of claim 1, wherein the presence of life corresponds to the life of a human.

4. The situational awareness system of claim 1, wherein the one or more sensors are configured to detect:

a size and layout of a room; and a presence and location of furniture in the room.

5. The situational awareness system of claim 1, wherein the one or more sensors are configured to detect a presence of smoke.

6. The situational awareness system of claim 1, wherein the one or more sensors are configured to detect a temperature layout of an environment.

7. The situational awareness system of claim 1, wherein the high-temperature-resistant enclosure further comprises at least one window.

8. The situational awareness system of claim 1, wherein the high-temperature-resistant enclosure is substantially round, and wherein the one or more of manual and mechanical launching comprises rolling the high-temperature-resistant enclosure.

9. A method of using a situational awareness system, the method comprising:

manually or mechanically launching a high-temperature-resistant enclosure of the situational awareness system such that the high-temperature-resistant enclosure is delivered to a location at or near a high-temperature area;

detecting one or more environmental factors using one or more sensors encased by a high-temperature-resistant enclosure of the situational awareness system, wherein a first at least one of the one or more environmental factors is detected using a radar sensor of the one or more sensors, and wherein a second at least one of the one or more environmental factors indicates a presence of life;

communicating first data corresponding to the detected one or more environmental factors from the one or more sensors to a first computer encased by the high-temperature-resistant enclosure of the situational awareness system;

performing a wireless communication between the first computer and a second computer using a wireless communication interface of the first computer;

receiving, at the second computer, sensor data from the first computer; and displaying, on a user interface of the second computer, a visual depiction of at least a portion of an environment near the high-temperature-resistant enclosure, wherein the visual depiction is based at least in part on the sensor data.

10. The method of claim 9, further comprising correlating radar data from the radar sensor with thermal data from a thermal sensor using one or more of the first computer and the second computer.

11. The method of claim 9, wherein the presence of life corresponds to the life of a human.

12. The method of claim 9, further comprising detecting, via the one or more sensors:

a size and layout of a room; and a presence and location of furniture in the room.

13. The method of claim 9, further comprising detecting a presence of smoke via the one or more sensors.

14. The method of claim 9, further comprising detecting a temperature layout of an environment via the one or more sensors.

15. The method of claim 9, wherein the high-temperature-resistant enclosure further comprises at least one window.

16. The method of claim 9, wherein the high-temperature-resistant enclosure is substantially round, and wherein the one or more of manual and mechanical launching comprises rolling the high-temperature-resistant enclosure.

17. A multi-sensor situational awareness system comprising:

a high-temperature-resistant enclosure configured for one or more of manual and mechanical launching;

at least one window disposed on the high-temperature-resistant enclosure;

two or more sensors encased by the high-temperature-resistant enclosure, the two or more sensors comprising:

a radar sensor; and a thermal sensor;

a first computer comprising a wireless communication interface configured to communicate with a second computer, wherein the first computer is encased by the high-temperature-resistant enclosure;

the second computer, wherein the second computer is located remote from the high-temperature-resistant enclosure, the second computer comprising:

one or more processors;

one or more non-transitory computer-readable media;

a user interface; and program instructions stored on the one or more non-transitory computer-readable media that are executable by the one or more processors to:

receive sensor data from the first computer; and display, on the user interface, a visual depiction of at least a portion of an environment near the high-temperature-resistant enclosure, wherein the visual depiction is based at least in part on the sensor data, wherein the two or more sensors are configured to detect a presence of life, wherein the two or more sensors are communicatively coupled to the first computer, and wherein one or more of the first computer and the second computer are configured to correlate radar data from the radar sensor with thermal data from the thermal sensor.

18. The multi-sensor situational awareness system of claim 17, wherein the high-temperature-resistant enclosure is substantially round, and wherein the one or more of manual and mechanical launching comprises rolling the high-temperature-resistant enclosure.

19. The situational awareness system of claim 1, wherein the second computer is located remote from the high-temperature-resistant enclosure.

20. The method of claim 9, wherein the second computer is located remote from the high-temperature-resistant enclosure.

* * * * *